(No Model.)
J. R. FLETCHER.
BRACKET FOR INSULATORS, &c.
No. 602,576. Patented Apr. 19, 1898.
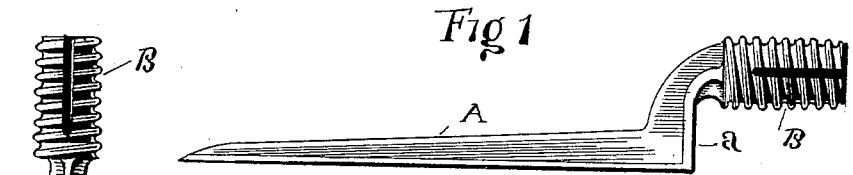
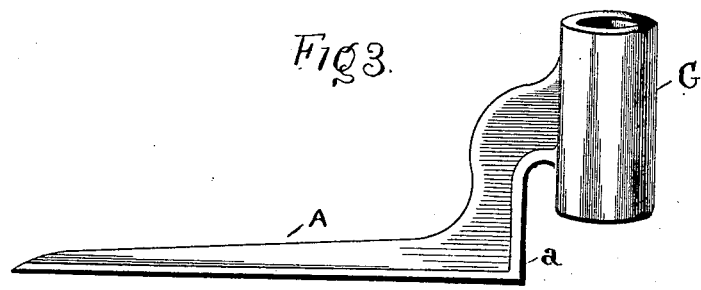
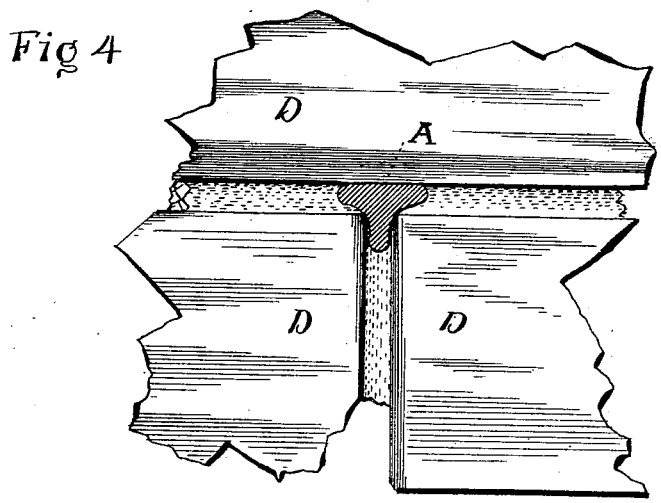
WITNESSES:
L. C. Leoty
Harvey G. Edwards
INVENTOR.
John R. Fletcher
BY Alfred M. Allen
ATTORNEY.

UNITED STATES PATENT OFFICE.

JOHN R. FLETCHER, OF DAYTON, OHIO.

BRACKET FOR INSULATORS, &c.

SPECIFICATION forming part of Letters Patent No. 602,576, dated April 19, 1898.

Application filed January 4, 1896. Renewed February 2, 1898. Serial No. 668,890. (No model.)

*To all whom it may concern:*

Be it known that I, JOHN R. FLETCHER, a citizen of the United States, residing at Dayton, in the county of Montgomery and State of Ohio, have invented certain new and useful Improvements in Brackets for Insulators and the Like, of which the following is a full, clear, and exact description, reference being had to the accompanying drawings, forming part of this specification.

My invention relates to improvements in brackets for insulators, the object of which is to provide a simple, cheap, and effective bracket adapted to be readily and easily driven into stone, brick, or wooden walls or other supporting-surfaces without the necessity for the use of screws or for plugging the brick or stone wall with wooden plugs.

In the drawings, Figure 1 is a side view of one of my brackets. Figs. 2 and 3 are similar views of same, showing different positions of the insulator-support. Fig. 4 is a cross-section of the bracket, showing the method of securing same to a brick or stone wall.

The bracket is preferably made entirely of metal and consists of a shank or blade A and a screw-threaded portion B, upon which the insulator is mounted. Sometimes instead of a screw-threaded portion I provide a hollow cylindrical head or thimble C, as shown in Fig. 3, within which a peg may be driven upon which to mount the insulator.

The inner end of the blade of the bracket is provided with a square shoulder $a$, against which the bracket may be struck to drive it into the wall or supporting-surface, as it would be likely to injure the screw-threaded portion if the bracket had to be driven in by striking this portion. The blade is triangular in cross-section, as shown in Fig. 4, and is tapered gradually from butt to point, and with this construction it can be driven into any wall without the necessity for plugging the same, the bracket being driven at the intersection of any two of the bricks D D with the third brick D, as shown in Fig. 4. In this way the bracket is firmly and rigidly attached to the wall, the top surface of the blade hugging the upper brick and the depending sides wedging themselves between the corners of the other bricks or stones. The tapered shape of the bracket-blade adapts it to fit snugly within any sized crevice, either large or small. When the bracket is driven into an auger-hole or other aperture in wood or other flexible material, the points of the triangle penetrate the sides of the opening and effectually prevent the bracket from turning out of position.

In addition to the saving of expense incident to the abandonment of screws to secure the bracket, as is usually done, very much less metal need be used in the construction of the bracket, and the bracket is neater and stronger in many respects than those heretofore in use.

Having thus described my invention, what I claim, and desire to secure by Letters Patent, is—

1. An insulator-bracket, substantially as described, provided with a head for the insulator or insulator-plug, and a blade having one flat side and two recessed sides and tapering from butt to point, adapted to be driven into a supporting-surface to secure same without the use of screws or plugging.

2. An insulator-bracket, substantially as described, provided with a head for the insulator or insulator-plug, and a blade having one flat side and two recessed sides and tapering from butt to point, with a square shoulder at the butt thereof, whereby the bracket may be driven into a supporting-surface without injury to the head and without the use of screws or plugging.

JOHN R. FLETCHER.

Witnesses:
   CHAS. T. TYSON,
   G. W. CHAFFIN.